United States Patent
Johnson et al.

(10) Patent No.: US 10,370,539 B2
(45) Date of Patent: Aug. 6, 2019

(54) SYSTEM FOR HIGH TEMPERATURE CHEMICAL PROCESSING

(71) Applicant: MONOLITH MATERIALS, INC., Redwood City, CA (US)

(72) Inventors: Peter L. Johnson, Mountain View, CA (US); Alexander F. Hoermann, Menlo Park, CA (US); Roscoe W. Taylor, San Mateo, CA (US); John J. Moss, Palo Alto, CA (US); Robert J. Hanson, San Carlos, CA (US)

(73) Assignee: MONOLITH MATERIALS, INC., Redwood City, CA (US)

( * ) Notice: Subject to any disclaimer, the term of this patent is extended or adjusted under 35 U.S.C. 154(b) by 0 days.

(21) Appl. No.: 14/591,476

(22) Filed: Jan. 7, 2015

(65) Prior Publication Data
US 2015/0210856 A1  Jul. 30, 2015

Related U.S. Application Data

(60) Provisional application No. 61/933,497, filed on Jan. 30, 2014.

(51) Int. Cl.
*C09C 1/48* (2006.01)
*B01J 19/08* (2006.01)
(Continued)

(52) U.S. Cl.
CPC ............ *C09C 1/485* (2013.01); *B01J 19/088* (2013.01); *H05H 1/40* (2013.01); *H05H 1/44* (2013.01);
(Continued)

(58) Field of Classification Search
CPC ..................................................... C09C 1/485
See application file for complete search history.

(56) References Cited

U.S. PATENT DOCUMENTS

| 1,339,225 A | 5/1920 | Rose |
|---|---|---|
| 1,536,612 A | 5/1925 | Lewis |

(Continued)

FOREIGN PATENT DOCUMENTS

| AU | 28970/71 A | 11/1972 |
|---|---|---|
| CA | 830378 A | 12/1969 |

(Continued)

OTHER PUBLICATIONS

Search report from P.C.T., dated May 11, 2015.
(Continued)

*Primary Examiner* — Stuart L Hendrickson
(74) *Attorney, Agent, or Firm* — Wilson Sonsini Goodrich & Rosati

(57) ABSTRACT

A method and apparatus for making carbon black. A plasma gas is flowed into a plasma forming region containing at least one, magnetically isolated, plasma torch containing at least one electrode, and forming a plasma. Collecting the plasma formed in a cooled header and flowing the plasma through at least one reaction region to heat the reaction region, and injecting carbon black forming feedstock into the reaction region, resulting in the formation of at least one grade of carbon black. An apparatus for making carbon black is also described including a plasma forming section containing at least one, magnetically isolated plasma torch containing at least one electrode, in fluid flow communication with at least one carbon black forming reactor section, the plasma section and reactor section separated by a plasma formed collection header.

17 Claims, 4 Drawing Sheets

(51) Int. Cl.
*H05H 1/40* (2006.01)
*H05H 1/44* (2006.01)

(52) U.S. Cl.
CPC .................... *B01J 2219/0809* (2013.01); *B01J 2219/0815* (2013.01); *B01J 2219/0839* (2013.01); *B01J 2219/0841* (2013.01); *B01J 2219/0871* (2013.01); *B01J 2219/0875* (2013.01); *B01J 2219/0898* (2013.01)

(56) References Cited

U.S. PATENT DOCUMENTS

| | | | |
|---|---|---|---|
| 1,597,277 A | 8/1926 | Jakowsky | |
| 2,062,358 A | 9/1932 | Frolich | |
| 2,002,003 A | 5/1935 | Eisenhut et al. | |
| 2,393,106 A | 1/1946 | Johnson et al. | |
| 2,557,143 A | 6/1951 | Royster | |
| 2,572,851 A | 10/1951 | Gardner et al. | |
| 2,603,669 A | 7/1952 | Chappell | |
| 2,616,842 A | 11/1952 | Sheer et al. | |
| 2,785,964 A | 3/1957 | Pollock | |
| 2,850,403 A | 9/1958 | Day | |
| 2,951,143 A | 8/1960 | Anderson et al. | |
| 3,009,783 A | 11/1961 | Sheer et al. | |
| 3,073,769 A | 1/1963 | Doukas | |
| 3,288,696 A | 11/1966 | Orbach | |
| 3,307,923 A | 3/1967 | Ruble | |
| 3,308,164 A | 3/1967 | Shepard | |
| 3,309,780 A | 3/1967 | Goins | |
| 3,331,664 A | 7/1967 | Jordan | |
| 3,344,051 A | 9/1967 | Latham, Jr. | |
| 3,408,164 A | 10/1968 | Johnson | |
| 3,409,403 A | 11/1968 | Bjornson et al. | |
| 3,420,632 A | 1/1969 | Ryan | |
| 3,431,074 A | 3/1969 | Jordan | |
| 3,464,793 A | 9/1969 | Jordan et al. | |
| 3,619,140 A | 11/1971 | Morgan et al. | |
| 3,637,974 A | 1/1972 | Tajbl et al. | |
| 3,673,375 A | 6/1972 | Camacho | |
| 3,725,103 A | 4/1973 | Jordan et al. | |
| 3,922,335 A | 11/1975 | Jordan et al. | |
| 3,981,654 A | 9/1976 | Rood et al. | |
| 3,981,659 A | 9/1976 | Myers | |
| 3,984,743 A | 10/1976 | Horie | |
| 4,028,072 A | 6/1977 | Braun et al. | |
| 4,035,336 A | 7/1977 | Jordan et al. | |
| 4,057,396 A | 11/1977 | Matovich | |
| 4,075,160 A | 2/1978 | Mills et al. | |
| 4,101,639 A | 7/1978 | Surovikin et al. | |
| 4,199,545 A | 4/1980 | Matovich | |
| 4,282,199 A | 8/1981 | Lamond et al. | |
| 4,289,949 A | 9/1981 | Raaness et al. | |
| 4,317,001 A | 2/1982 | Silver et al. | |
| 4,372,937 A | 2/1983 | Johnson | |
| 4,404,178 A | 9/1983 | Johnson et al. | |
| 4,452,771 A | 6/1984 | Hunt | |
| 4,431,624 A | 8/1984 | Casperson | |
| 4,472,172 A | 9/1984 | Sheer et al. | |
| 4,553,981 A | 11/1985 | Fuderer | |
| 4,601,887 A | 7/1986 | Dorn et al. | |
| 4,678,888 A | 7/1987 | Camacho et al. | |
| 4,689,199 A | 8/1987 | Eckert et al. | |
| 4,765,964 A | 8/1988 | Gravley et al. | |
| 4,787,320 A | 11/1988 | Raaness et al. | |
| 4,864,096 A | 9/1989 | Wolf et al. | |
| 4,977,305 A | 12/1990 | Severance, Jr. | |
| 5,039,312 A | 8/1991 | Hollis, Jr. et al. | |
| 5,045,667 A | 9/1991 | Iceland et al. | |
| 5,046,145 A | 9/1991 | Drouet | |
| 5,105,123 A * | 4/1992 | Ballou ............... | H05H 1/48 250/423 R |
| 5,147,998 A | 9/1992 | Tsantrizos et al. | |
| 5,206,880 A | 4/1993 | Olsson | |
| 5,352,289 A | 10/1994 | Weaver et al. | |
| 5,399,957 A | 3/1995 | Vierboom et al. | |
| 5,476,826 A | 12/1995 | Greenwald et al. | |
| 5,481,080 A | 1/1996 | Lynum et al. | |
| 5,486,674 A | 1/1996 | Lynum et al. | |
| 5,500,501 A | 3/1996 | Lynum et al. | |
| 5,527,518 A | 6/1996 | Lynum et al. | |
| 5,593,644 A | 1/1997 | Norman et al. | |
| 5,604,424 A | 2/1997 | Shuttleworth | |
| 5,611,947 A | 3/1997 | Vavruska | |
| 5,717,293 A | 2/1998 | Sellers | |
| 5,725,616 A | 3/1998 | Lynum et al. | |
| 5,749,937 A | 5/1998 | Detering et al. | |
| 5,935,293 A | 8/1999 | Detering et al. | |
| 5,951,960 A | 9/1999 | Lynum et al. | |
| 5,989,512 A | 11/1999 | Lynum et al. | |
| 5,997,837 A | 12/1999 | Lynum et al. | |
| 6,068,827 A | 5/2000 | Lynum et al. | |
| 6,099,696 A | 8/2000 | Schwob et al. | |
| 6,188,187 B1 | 2/2001 | Harlan | |
| 6,197,274 B1 | 3/2001 | Mahmud et al. | |
| 6,358,375 B1 | 3/2002 | Schwob | |
| 6,380,507 B1 | 4/2002 | Childs | |
| 6,395,197 B1 | 5/2002 | Detering et al. | |
| 6,403,697 B1 | 6/2002 | Mitsunaga et al. | |
| 6,441,084 B1 | 8/2002 | Lee et al. | |
| 6,442,950 B1 | 9/2002 | Tung | |
| 6,444,727 B1 | 9/2002 | Yamada et al. | |
| 6,602,920 B2 | 8/2003 | Hall et al. | |
| 6,703,580 B2 | 3/2004 | Brunet et al. | |
| 6,773,689 B1 | 8/2004 | Lynum et al. | |
| 7,167,240 B2 | 1/2007 | Stagg | |
| 7,431,909 B1 | 10/2008 | Rumpf et al. | |
| 7,452,514 B2 | 11/2008 | Fabry et al. | |
| 7,462,343 B2 | 12/2008 | Lynum et al. | |
| 7,563,525 B2 | 7/2009 | Ennis | |
| 7,655,209 B2 | 2/2010 | Rumpf et al. | |
| 8,147,765 B2 | 4/2012 | Muradov et al. | |
| 8,221,689 B2 | 7/2012 | Boutot et al. | |
| 8,257,452 B2 | 9/2012 | Menzel | |
| 8,277,739 B2 | 10/2012 | Monsen et al. | |
| 8,323,793 B2 | 12/2012 | Hamby et al. | |
| 8,443,741 B2 | 5/2013 | Chapman et al. | |
| 8,471,170 B2 | 6/2013 | Li et al. | |
| 8,486,364 B2 | 7/2013 | Vanier et al. | |
| 8,501,148 B2 | 8/2013 | Belmont et al. | |
| 8,581,147 B2 | 11/2013 | Kooken et al. | |
| 8,710,136 B2 | 4/2014 | Yurovskaya et al. | |
| 8,771,386 B2 | 7/2014 | Licht et al. | |
| 8,784,617 B2 | 7/2014 | Novoselov et al. | |
| 8,850,826 B2 | 10/2014 | Ennis | |
| 8,871,173 B2 | 10/2014 | Nester et al. | |
| 8,911,596 B2 | 12/2014 | Vancina | |
| 9,095,835 B2 | 8/2015 | Skoptsov et al. | |
| 9,445,488 B2 | 9/2016 | Foret | |
| 9,574,086 B2 | 2/2017 | Johnson et al. | |
| 10,138,378 B2 | 11/2018 | Hoermman et al. | |
| 2001/0029888 A1 | 10/2001 | Sindarrajan et al. | |
| 2001/0039797 A1 | 11/2001 | Cheng | |
| 2002/0000085 A1 * | 1/2002 | Hall ................ | B01J 8/02 60/772 |
| 2002/0050323 A1 | 5/2002 | Moisan et al. | |
| 2002/0051903 A1 | 5/2002 | Masuko et al. | |
| 2002/0157559 A1 | 10/2002 | Brunet et al. | |
| 2003/0103858 A1 | 6/2003 | Baran et al. | |
| 2003/0152184 A1 | 8/2003 | Shehanee et al. | |
| 2004/0047779 A1 | 3/2004 | Denison | |
| 2004/0071626 A1 | 4/2004 | Smith et al. | |
| 2004/0081862 A1 | 4/2004 | Herman | |
| 2004/0148860 A1 * | 8/2004 | Fletcher ............ | B01J 19/088 48/127.9 |
| 2004/0168904 A1 | 9/2004 | Anazawa et al. | |
| 2004/0211760 A1 | 10/2004 | Delzenne et al. | |
| 2004/0216559 A1 | 11/2004 | Kim et al. | |
| 2004/0247509 A1 | 12/2004 | Newby | |
| 2005/0063892 A1 | 3/2005 | Tandon et al. | |
| 2005/0079119 A1 | 4/2005 | Kawakami et al. | |
| 2005/0230240 A1 | 10/2005 | Dubrovsky et al. | |
| 2006/0034748 A1 | 2/2006 | Lewis et al. | |
| 2006/0037244 A1 | 2/2006 | Clawson | |
| 2006/0068987 A1 | 3/2006 | Bollepalli et al. | |

(56) References Cited

U.S. PATENT DOCUMENTS

| | | |
|---|---|---|
| 2006/0107789 A1 | 5/2006 | Deegan et al. |
| 2006/0226538 A1 | 10/2006 | Kawata |
| 2006/0239890 A1 | 10/2006 | Chang et al. |
| 2007/0140004 A1 | 6/2007 | Marotta et al. |
| 2007/0183959 A1 | 8/2007 | Charlier et al. |
| 2007/0270511 A1 | 11/2007 | Melnichuk et al. |
| 2007/0293405 A1 | 12/2007 | Zhang et al. |
| 2008/0041829 A1 | 2/2008 | Blutke et al. |
| 2008/0121624 A1 | 5/2008 | Belashchenko et al. |
| 2008/0169183 A1 | 7/2008 | Hertel et al. |
| 2008/0182298 A1* | 7/2008 | Day .................... C01B 3/22 435/72 |
| 2008/0226538 A1 | 9/2008 | Rumpf et al. |
| 2008/0279749 A1 | 11/2008 | Probst et al. |
| 2008/0292533 A1 | 11/2008 | Belmont et al. |
| 2009/0090282 A1 | 4/2009 | Gold et al. |
| 2009/0142250 A1 | 6/2009 | Fabry et al. |
| 2009/0155157 A1 | 6/2009 | Stenger et al. |
| 2009/0173252 A1 | 7/2009 | Nakata et al. |
| 2009/0208751 A1 | 8/2009 | Green et al. |
| 2009/0230098 A1 | 9/2009 | Salsich et al. |
| 2010/0147188 A1 | 6/2010 | Mamak et al. |
| 2010/0249353 A1 | 9/2010 | Macintosh et al. |
| 2011/0036014 A1 | 2/2011 | Tsangaris et al. |
| 2011/0071692 A1 | 3/2011 | D'Amato et al. |
| 2011/0071962 A1 | 3/2011 | Lim |
| 2011/0076608 A1 | 3/2011 | Bergemann et al. |
| 2011/0138766 A1 | 6/2011 | Elkady et al. |
| 2011/0155703 A1 | 6/2011 | Winn |
| 2011/0180513 A1 | 7/2011 | Luhrs et al. |
| 2011/0239542 A1 | 10/2011 | Liu et al. |
| 2012/0018402 A1 | 1/2012 | Carducci et al. |
| 2012/0025693 A1 | 2/2012 | Wang et al. |
| 2012/0201266 A1 | 8/2012 | Boulos et al. |
| 2012/0232173 A1 | 9/2012 | Juranitch et al. |
| 2012/0292794 A1 | 11/2012 | Prabhu et al. |
| 2013/0039841 A1 | 2/2013 | Nester et al. |
| 2013/0062195 A1 | 3/2013 | Samaranayake et al. |
| 2013/0062196 A1 | 3/2013 | Sin |
| 2013/0092525 A1 | 4/2013 | Li et al. |
| 2013/0194840 A1 | 8/2013 | Huselstein et al. |
| 2013/0292363 A1 | 11/2013 | Hwang et al. |
| 2013/0323614 A1 | 12/2013 | Chapman et al. |
| 2013/0340651 A1 | 12/2013 | Wampler et al. |
| 2014/0000488 A1 | 1/2014 | Sekiyama et al. |
| 2014/0057166 A1 | 2/2014 | Yokoyama et al. |
| 2014/0131324 A1 | 5/2014 | Shipulski et al. |
| 2014/0190179 A1 | 7/2014 | Barker et al. |
| 2014/0224706 A1 | 8/2014 | Do et al. |
| 2014/0227165 A1 | 8/2014 | Hung et al. |
| 2014/0248442 A1 | 9/2014 | Luizi et al. |
| 2014/0290532 A1 | 10/2014 | Rodriguez et al. |
| 2014/0294716 A1 | 10/2014 | Susekov et al. |
| 2014/0339478 A1 | 11/2014 | Probst et al. |
| 2014/0357092 A1 | 12/2014 | Singh |
| 2014/0373752 A2 | 12/2014 | Hassinen et al. |
| 2015/0044516 A1 | 2/2015 | Kyrlidis et al. |
| 2015/0056516 A1 | 2/2015 | Hellring et al. |
| 2015/0064099 A1 | 3/2015 | Nester et al. |
| 2015/0180346 A1 | 6/2015 | Yuzurihara et al. |
| 2015/0210856 A1* | 7/2015 | Johnson ................ C09C 1/485 423/449.1 |
| 2015/0210857 A1 | 7/2015 | Johnson et al. |
| 2015/0210858 A1 | 7/2015 | Hoermann et al. |
| 2015/0211378 A1 | 7/2015 | Johnson et al. |
| 2015/0217940 A1 | 8/2015 | Si et al. |
| 2015/0218383 A1 | 8/2015 | Johnson et al. |
| 2015/0223314 A1 | 8/2015 | Hoermann et al. |
| 2015/0252168 A1 | 9/2015 | Schuck et al. |
| 2016/0030856 A1 | 2/2016 | Kaplan et al. |
| 2016/0293959 A1 | 10/2016 | Blizanac et al. |
| 2017/0034898 A1 | 2/2017 | Moss et al. |
| 2017/0037253 A1 | 2/2017 | Hardman et al. |
| 2017/0058128 A1 | 3/2017 | Johnson et al. |
| 2017/0066923 A1 | 3/2017 | Hardman et al. |
| 2017/0073522 A1 | 3/2017 | Hardman et al. |
| 2017/0349758 A1 | 12/2017 | Johnson |
| 2018/0015438 A1 | 1/2018 | Taylor et al. |
| 2018/0016441 A1 | 1/2018 | Taylor et al. |
| 2018/0022925 A1 | 1/2018 | Hardman et al. |
| 2019/0100658 A1 | 4/2019 | Taylor et al. |

FOREIGN PATENT DOCUMENTS

| | | |
|---|---|---|
| CA | 964 405 A1 | 3/1975 |
| CA | 2 353 752 A1 | 1/2003 |
| CA | 2 621 749 A1 | 8/2009 |
| CN | 1644650 A | 7/2005 |
| CN | 102108216 A | 6/2011 |
| CN | 102993788 A | 3/2013 |
| CN | 103160149 A | 6/2013 |
| CN | 203269847 U | 11/2013 |
| DE | 211457 A3 | 7/1984 |
| DE | 198 07 224 A1 | 8/1999 |
| EA | 200300389 | 12/2003 |
| EP | 0 325 689 A1 | 8/1989 |
| EP | 0 616 600 A1 | 9/1994 |
| EP | 0 635 044 B1 | 2/1996 |
| EP | 0 635 043 B1 | 6/1996 |
| EP | 0 861 300 A1 | 9/1998 |
| EP | 1017622 A1 | 7/2000 |
| EP | 1 188 801 A1 | 3/2002 |
| EP | 1 088 854 A2 | 4/2010 |
| FR | 2 891 434 A1 | 3/2007 |
| FR | 2 937 029 A1 | 4/2010 |
| GB | 395 893 A | 7/1933 |
| GB | 987498 | 3/1965 |
| GB | 1 400 266 A | 7/1975 |
| GB | 1 492 346 A | 11/1977 |
| GB | 2419883 A | 5/2006 |
| JP | 4-228270 A | 8/1992 |
| JP | 6-322615 A | 11/1994 |
| JP | 9-316645 A | 12/1997 |
| JP | 11-123562 A | 5/1999 |
| JP | 2004-300334 A | 10/2004 |
| JP | 2005-235709 A | 9/2005 |
| JP | 2005-243410 A | 9/2005 |
| KR | 10-2008-105344 A | 12/2008 |
| KR | 2014-0075261 A | 6/2014 |
| RU | 2425795 | 8/2011 |
| RU | 2488984 | 7/2013 |
| WO | 93/12031 | 6/1993 |
| WO | 93/18094 A1 | 9/1993 |
| WO | 93/20153 A1 | 10/1993 |
| WO | 93/23331 A1 | 11/1993 |
| WO | 1994/008747 A1 | 4/1994 |
| WO | 97/03133 | 1/1997 |
| WO | 98/13428 A1 | 4/1998 |
| WO | 03/014018 A1 | 2/2003 |
| WO | 2012/015313 A1 | 2/2012 |
| WO | 2012/067546 A2 | 5/2012 |
| WO | 2012/094743 A1 | 7/2012 |
| WO | 2012/149170 A1 | 11/2012 |
| WO | 2013/134093 A1 | 9/2013 |
| WO | 2013/184074 A1 | 12/2013 |
| WO | 2013/185219 A1 | 12/2013 |
| WO | 2014/000108 A1 | 1/2014 |
| WO | 2014/012169 A1 | 1/2014 |
| WO | 2015/049008 A1 | 4/2015 |
| WO | 2015/093947 A1 | 6/2015 |
| WO | 2015/116797 A1 | 8/2015 |
| WO | 2015/116798 A1 | 8/2015 |
| WO | 2015/116800 A1 | 8/2015 |
| WO | 2015/116807 A1 | 8/2015 |
| WO | 2015/116811 A1 | 8/2015 |
| WO | 2015/116943 A2 | 8/2015 |
| WO | 2016/012367 A1 | 1/2016 |
| WO | 2016/014641 A1 | 8/2016 |
| WO | 2016/126598 A1 | 8/2016 |
| WO | 2016/126599 A1 | 8/2016 |
| WO | 2016/126600 A1 | 8/2016 |
| WO | 2017/019683 A1 | 2/2017 |
| WO | 2017/027385 A1 | 2/2017 |
| WO | 2017/034980 A1 | 3/2017 |

(56) References Cited

FOREIGN PATENT DOCUMENTS

| WO | 2017/044594 A1 | 3/2017 |
|---|---|---|
| WO | 2017/048621 A1 | 3/2017 |
| WO | 2017/190015 A1 | 11/2017 |
| WO | 2017/190045 A1 | 11/2017 |
| WO | 2018/165483 A1 | 9/2018 |
| WO | 2018/195460 A1 | 10/2018 |

OTHER PUBLICATIONS

ISR and Written Opinion from PCT/US2015/013482, dated Jun. 17, 2015.
ISR and Written Opinion from PCT/US2015/013505, dated May 11, 2015.
ISR and Written Opinion from PCT/US2015/013794, dated Jun. 19, 2015.
Donnet, Basal and Wang, "Carbon Black", New York: Marcel Dekker, 1993 pp. 46, 47 and 54.
Boehm, HP, "Some Aspects of Surface Chemistry of Carbon Blacks and Other Carbons", Carbon 1994, p. 759.
"The Science and Technology of Rubber" (Mark, Erman, and Roland, Fourth Edition, Academic Press, 2013).
"Carbon Black Elastomer Interaction" Rubber Chemistry and Technology, 1991, pp. 19-39.
"The Impact of a Fullerene-Like Concept in Carbon Black Science", Carbon, 2002, pp. 157-162.
ISR and Written Opinion from PCT/US2015/013510, dated Apr. 22, 2015.
ISR and Written Opinion from PCT/US2016/015939, dated Jun. 3, 2016.
ISR and Written Opinion from PCT/US2016/015941, dated Apr. 21, 2016.
ISR and Written Opinion from PCT/US2016/015942, dated Apr. 11, 2016.
ISR and Written Opinion from PCT/US2016/044039, dated Oct. 6, 2016.
ISR and Written Opinion from PCT/US2016/045793, dated Oct. 18, 2016.
ISR and Written Opinion from PCT/US2016/050728, dated Nov. 18, 2016.
ISR and Written Opinion from PCT/US2016/051261, dated Nov. 18, 2016.
ISR and Written Opinion from PCT/US2015/013484, dated Apr. 22, 2015.
Ap 42, Fifth Edition, vol. I, Chapter 6: Organic Chemical Process Industry, Section 6.1: Carbon Black.
Fulcheri, et al. "Plasma processing: a step towards the production of new grades of carbon black." Carbon 40.2 (2002): 169-176.
Grivei, et al. "A clean process for carbon nanoparticles and hydrogen production from plasma hydrocarbon cracking" Publishable Report, European Commission JOULE III Programme, Project No. JOE3-CT97-0057, circa 2000.
Fabry, et al. "Carbon black processing by thermal plasma. Analysis of the particle formation mechanism." Chemical Engineering Science 56.6 (2001): 2123-2132.
Pristavita, et al. "Carbon nanoparticle production by inductively coupled thermal plasmas: controlling the thermal history of particle nucleation." Plasma Chemistry and Plasma Processing 31.6 (2011): 851-866.
Cho, et al. "Conversion of natural gas to hydrogen and carbon black by plasma and application of plasma black." Symposia—American Chemical Society, Div. Fuel Chem. vol. 49. 2004.
Pristavita, et al. "Carbon blacks produced by thermal plasma: the influence of the reactor geometry on the product morphology." Plasma Chemistry and Plasma Processing 30.2 (2010): 267-279.
Pristavita, et al. "Volatile Compounds Present in Carbon Blacks Produced by Thermal Plasmas." Plasma Chemistry and Plasma Processing 31.6 (2011): 839-850.
Garberg, et al. "A transmission electron microscope and electron diffraction study of carbon nanodisks." Carbon 46.12 (2008): 1535-1543.
Knaapila, et al. "Directed assembly of carbon nanocones into wires with an epoxy coating in thin films by a combination of electric field alignment and subsequent pyrolysis." Carbon 49.10 (2011): 3171-3178.
Krishnan, et al. "Graphitic cones and the nucleation of curved carbon surfaces." Nature 388.6641 (1997): 451-454.
Høyer, et al. "Microelectromechanical strain and pressure sensors based on electric field aligned carbon cone and carbon black particles in a silicone elastomer matrix." Journal of Applied Physics 112.9 (2012): 094324.
Naess, Stine Nalum, et al. "Carbon nanocones: wall structure and morphology." Science and Technology of advanced materials (2009), 7 pages.
Fulcheri, et al. "From methane to hydrogen, carbon black and water." International journal of hydrogen energy 20.3 (1995): 197-202.
ISR and Written Opinion from PCT/US2016/047769, dated Dec. 30, 2016.
D.L. Sun, F. Wang, R.Y. Hong, C.R. Xie, Preparation of carbon black via arc discharge plasma enhanced by thermal pyrolysis, Diamond & Related Materials (2015), doi: 10.1016/j.diamond.2015.11.004, 47 pages.
Non-Final Office Action dated Feb. 22, 2017 in U.S. Appl. No. 14/591,541.
Non-Final Office Action dated May 2, 2017 in U.S. Appl. No. 14/610,299.
Ex Parte Quayke Action mailed May 19, 2017 in U.S. Appl. No. 14/601,761.
Extended European Search Report from EP Application No. 15 742 910.1 dated Jul. 18, 2017.
Search report in counterpart European Application No. 15 74 3214 dated Sep. 12, 2017.
ISR and Written Opinion from PCT/US2017/030139, dated Jul. 19, 2017.
ISR and Written Opinion from PCT/US2017/030179, dated Jul. 27, 2017.
A.I. Media et al., "Tinting Strength of Carbon Black," Journal of Colloid and Interface Science, vol. 40, No. 2, Aug. 1972.
Reese, J. (2017). "Resurgence in American manufacturing will be led by the rubber and tire industry." Rubber World. 255. 18-21 and 23.
Non-Final Office Action dated Feb. 27, 2017 in U.S. Appl. No. 14/591,476.
Extended European Search Report from EP Application No. 15743214.7 dated Jan. 16, 2018.
Chiesa P, Lozza G, Mazzocchi L. Using Hydrogen as Gas Turbine Fuel. ASME. J. Eng. Gas Turbines Power. 2005;127(1):73-80. doi:10.1115/1.1787513.
Tsujikawa, Y., and T. Sawada. "Analysis of a gas turbine and steam turbine combined cycle with liquefied hydrogen as fuel." International Journal of Hydrogen Energy 7.6 (1982): 499-505.
Search report from RU2016135213, dated Feb. 12, 2018.
Non-Final Office Action dated Jan. 16, 2018 in U.S. Appl. No. 14/591,528.
Bakken, Jon Arne, et al. "Thermal plasma process development in Norway." Pure and applied Chemistry 70.6 (1998): 1223-1228.
Polman, E. A., J. C. De Laat, and M. Crowther. "Reduction of CO2 emissions by adding hydrogen to natural gas." IEA Green House Gas R&D programme (2003).
Verfondern, K., "Nuclear Energy for Hydrogen Production", Schriften des Forschungzentrum Julich, vol. 58, 2007.
U.S. Environmental Protection Agency, "Guide to Industrial Assessments for Pollution Prevention and Energy Efficiency," EPA 625/R-99/003, 1999.
Breeze, P. "Raising steam plant efficiency-Pushing the steam cycle boundaries." PEI Magazine 20.4 (2012).
Final Office Action dated Oct. 13, 2017 in U.S. Appl. No. 14/591,476.
Final Office Action dated Oct. 13, 2017 in U.S. Appl. No. 14/591,541.
Notice of Allowance dated Jan. 18, 2018 in U.S. Appl. No. 14/601,761.

(56) References Cited

OTHER PUBLICATIONS

Correced Notice of Allowance dated Feb. 9, 2018 in U.S. Appl. No. 14/601,761.
Final Office Action dated Sep. 19, 2017 in U.S. Appl. No. 15/221,088.
Non-Final Office Action dated Jan. 9, 2018 in U.S. Appl. No. 15/259,884.
Russian Official Notification of application No. 2016135213 from Russia dated Feb. 12, 2018.
Non-Final Office Action dated Mar. 16, 2016 in U.S. Appl. No. 14/591,476.
Final Office Action dated Jul. 11, 2016 in in U.S. Appl. No. 14/591,476.
Non-Final Office Action dated Mar. 16, 2016 in U.S. Appl. No. 14/591,541.
Final Office Action dated Jul. 14, 2016 in U.S. Appl. No. 14/591,541.
Non-Final Office Action dated Apr. 14, 2016 in U.S. Appl. No. 14/601,761.
Final Office Action dated Oct. 19, 2016 in U.S. Appl. No. 14/601,761.
Non-Final Office Action dated Apr. 13, 2016 in U.S. Appl. No. 14/601,793.
Final Office Action dated Aug. 3, 2016 in U.S. Appl. No. 14/601,793.
Notice of Allowance dated Oct. 7, 2016 in U.S. Appl. No. 14/601,793.
Non-Final Office Action dated Dec. 23, 2016 in U.S. Appl. No. 15/221,088.
Non-Final Office Action dated Apr. 20, 2018 in U.S. Appl. No. 15/221,088.
Donnet et al. "Observation of Plasma-Treated Carbon Black Surfaces by Scanning Tunnelling Microscopy," Carbon (1994) 32(2):199-206.
Larouche et al. "Nitrogen Functionalization of Carbon Black in a Thermo-Convective Plasma Reactor," Plasma Chem Plasma Process (2011) 31:635-647.
Reynolds, "Electrode Resistance: How Important is Surface Area" Oct. 10, 2016. p. 3 para[0001]; Figure 3; Retrieved from http://electrofishing.net/2016/10/10/electrode-resistance-how-important-is-surface-area/ on May 8, 2018.
Wikipedia "Heating Element" Oct. 14, 2016. p. 1 para[0001]. Retrieved from https://en.wikipedia.org/w/index.php?title=Heating_element&oldid=744277540 on May 9, 2018.
Wikipedia "Joule Heating" Jan. 15, 2017. p. 1 para[0002]. Retrieved from https://en.wikipedia.org/w/index.php?title=Joule_heating&oldid=760136650 on May 9, 2018.
Extended European Search Report from EP Application No. 16747055.8 dated Jun. 27, 2018.
Extended European Search Report from EP Application No. 16747056.6 dated Jun. 27, 2018.
Extended European Search Report from EP Application No. 16747057.4 dated Oct. 9, 2018.
Extended European Search Report from EP Application No. 16835697.0 dated Nov. 28, 2018.
Final Office Action from U.S. Appl. No. 15/259,884, dated Oct. 11, 2018.
Invitation to Pay Additional Fees dated Jun. 18, 2018 in PCT/US2018/028619.
Invitation to Pay Additional Fees in PCT/US2018/048378 dated Oct. 26, 2018.
Invitation to Pay Additional Fees in PCT/US2018/048381 dated Oct. 9, 2018.
IPRP from PCT/US2015/013482, dated Aug. 2, 2016.
IPRP from PCT/US2015/013487, dated Aug. 2, 2016.
IPRP from PCT/US2017/030139 dated Oct. 30, 2018.
IPRP from PCT/US2017/030179 dated Oct. 30, 2018.
ISR and Written Opinion for PCT/US2018/048374 dated Nov. 26, 2018.
ISR and Written Opinion for PCT/US2018/048378 dated Dec. 20, 2018.
ISR and Written Opinion for PCT/US2018/048381 dated Dec. 14, 2018.
ISR and Written Opinion from PCT/US2018/021627, dated May 31, 2018.
ISR and Written Opinion from PCT/US2018/028619, dated Aug. 9, 2018.
Non-Final Office Action dated Jul. 6, 2018 in U.S. Appl. No. 15/241,771.
Non-Final Office Action dated Jun. 1, 2018 in U.S. Appl. No. 15/262,539.
Non-Final Office Action dated Jun. 7, 2018 in U.S. Appl. No. 15/410,283.
Non-Final Office Action from U.S. Appl. No. 15/548,352 dated Oct. 10, 2018.
Notice of Allowance dated Jun. 19, 2018 in U.S. Appl. No. 14/601,761.
Notice of Allowance dated Jun. 7, 2018 in U.S. Appl. No. 14/591,541.
Invitation to Pay Additional Fees in PCT/US2018/057401 dated Dec. 19, 2018.
Final Office Action for U.S. Appl. No. 15/262,539 dated Jan. 4, 2019.
Gago et al., "Growth mechanisms and structure of fullerene-like carbon-based thin films: superelastic materials for tribological applications," Trends in Fullerene Research, Published by Nova Science Publishers, Inc. (2007), pp. 1-46.
EP16845031.0 Extended European Search Report dated Mar. 18, 2019.
Garberg, et al., A transmission electron microscope and electron diffraction study of carbon nanodisks. Carbon 46 (2008) 1535-1543.
Hernandez, et al. Comparison of carbon nanotubes and nanodisks as percolative fillers in electrically conductive composites. Scripta Materialia 58 (2008) 69-72.
U.S. Appl. No. 15/548,348 Office Action dated Apr. 25, 2019.
U.S. Appl. No. 15/229,608 Office Action dated Apr. 8, 2019.
U.S. Appl. No. 15/259,884 Office Action dated May 31, 2019.
U.S. Appl. No. 15/548,352 Office Action dated May 9, 2019.

\* cited by examiner

SYSTEM FOR HIGH TEMPERATURE CHEMICAL PROCESSING

CROSS-REFERENCE TO RELATED APPLICATIONS

The present application claims the benefit under 35 U.S.C. § 119(e) of U.S. Provisional Application No. 61/933,497 filed Jan. 30, 2014, the disclosure of which is expressly incorporated by reference herein in its entirety.

TECHNICAL FIELD

The field of art to which this invention generally pertains is methods and apparatus for making use of electrical energy to effect chemical changes.

BACKGROUND

There are many processes that can be used and have been used over the years to produce carbon black. The energy sources used to produce such carbon blacks over the years have, in large part, been closely connected to the raw materials used to convert hydrocarbon containing materials into carbon black. Residual refinery oils and natural gas have long been a resource for the production of carbon black. Energy sources have evolved over time in chemical processes such as carbon black production from simple flame, to oil furnace, to plasma, to name a few. Because of the high temperatures involved, the high flow rates used for both energy and feedstock, and the difficulties involved with trying to control the properties of products resulting from such complex processes, there is a constant search in the art for ways to not only produce such products in more efficient and effective ways, but to improve the properties of the products produced as well.

The systems described herein meet the challenges described above while accomplishing additional advances as well.

BRIEF SUMMARY

A method of making carbon black is described including flowing a plasma gas into a plasma forming region containing at least one magnetically isolated plasma torch containing at least one electrode, and forming a plasma, collecting the plasma formed in a cooled collection header, flowing the plasma formed through at least one reaction region to mix with and heat reactants in the reaction region, injecting carbon black forming feedstock reactants into the reaction region, resulting in the formation of at least one grade of carbon black.

Embodiments of the invention include: the method described above including the use of multiple electrodes; the method described above where the electrodes are graphite electrodes; the method described above where the electrodes comprise copper, tungsten, aluminum, steel or alloys thereof; the method described above where the electrodes possess a sintered metal or metal oxide coating; the method described above including the use of multiple plasma torches; the method described above where the plasma gas contains hydrogen; the method described above where at least one plasma torch is vertically or substantially vertically oriented; the method described above where the header is water or gas cooled; the method described above where the reaction region is horizontally oriented; the method described above including the use of multiple reaction regions; the method described above where multiple grades of carbon black can be produced.

An apparatus for making carbon black is also described containing a plasma forming section containing at least one, magnetically isolated, vertically or substantially vertically oriented, plasma torch containing at least one electrode, in fluid flow communication with at least one carbon black forming reactor section, where the plasma region is separated from the reaction region by a cooled plasma collection header.

Additional embodiments include: the apparatus described above including multiple electrodes; the apparatus described above where the electrodes are graphite electrodes; the apparatus described above including multiple plasma torches; the apparatus described above where at least one plasma torch is vertically or substantially vertically oriented; the apparatus described above where the header is water or gas cooled; the apparatus described above where the reactor section is horizontally oriented; the apparatus described above where the reactor section is vertically or substantially vertically oriented; the apparatus described above where the plasma forming section is installed at or near ground level; the apparatus described above including multiple reactor sections where multiple grades of carbon black can be produced; the apparatus described above where the plasma forming section and the reactor section are separated by water cooled knife gate valves or flange spool pieces; and the apparatus described above including an access port next to the plasma forming section and aligned with axis of the reactor section.

These, and additional embodiments, will be apparent from the following descriptions.

DETAILED DESCRIPTION

Figure 1:
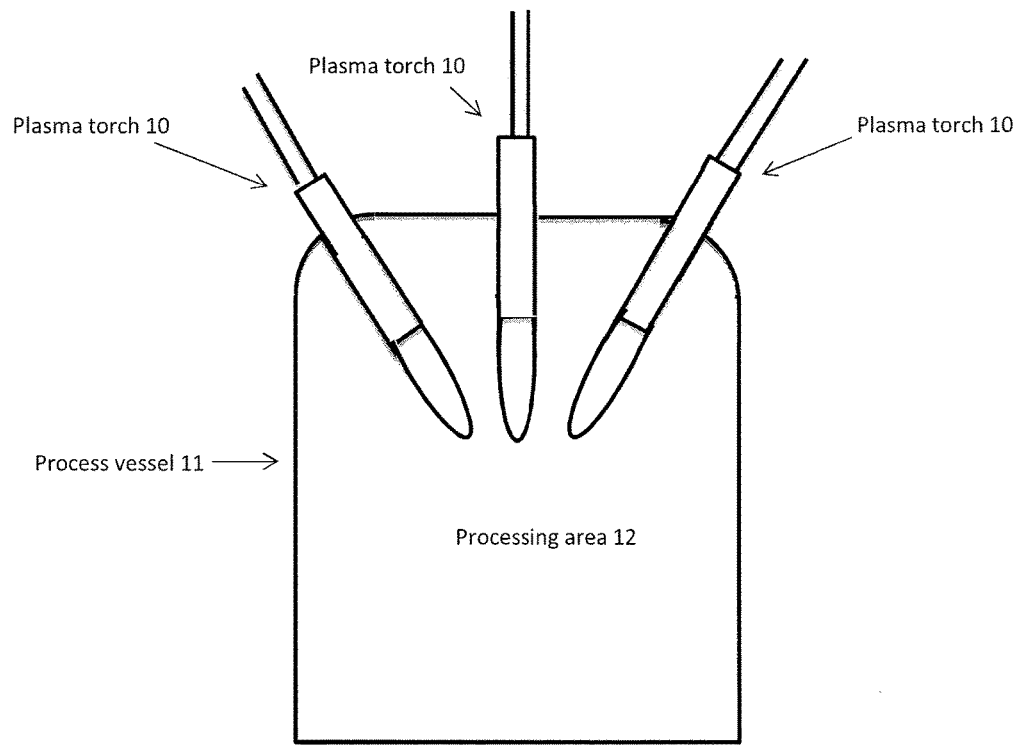
FIG. 1 shows a schematic representation of a typical multiple torch apparatus.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

A method of using multiple electrode plasma torches is described herein to produce a hot plasma stream for use in chemical processing. The electrodes can be made from graphite, copper, tungsten, aluminum, steel or other such materials. The electrodes can further be protected through the use of a sintered metal or metal oxide from corrosive plasma environment. The sintered metal at the surface can be comprised of aluminum, beryllium, gold, platinum, palladium, titanium or the oxides thereof as a nonlimiting example. The plasma stream can contain hydrogen in amounts typically used in carbon black production, for example, up to 50%, up to 90%, and even above 90%. In addition to allowing each torch to be installed in a vertical arrangement, this allows for ease of removal and allows for any broken pieces of graphite to fall out of the electrode area so as not to cause any shorts. This arrangement also allows for magnetic isolation of the various plasma torches so that the arc can be influenced by separately controlled magnetic fields. And of course while the reaction region can be present in a vertical or substantially vertical orientation, it can also be present in a horizontal or substantially horizontal orientation as well, and in fact any angle of orientation for the reaction region can be used although it would just cost more to build.

As described herein, operating the torches in a magnetically isolated fashion from each other provides significant advantage to the process. The torches are also typically very heavy, so they are easier to handle when operated in a vertical orientation. As described herein, even though multiple torches can be employed, they are kept magnetically isolated.

As described herein, advantages are recognized in the process by bundling the output of the torches in a collection header, or bundling the torches in a header. Typically, if and when multiple torches are used, they are emptied into the top of a reactor. By separating the torches from the reactor, significant process advantages can be realized. It is also advantageous to make the header as short as possible. In one embodiment, for example, the size of the header can be controlled/limited by placing the torches in the header at different angles, but still magnetically isolating them from each other. And again, all of the output of the torches is collected in the header, which again, produces significant process advantage.

A plasma furnace with more than one plasma torch installed at the top or upstream end of a common vessel allows for many advantages, including that the system can be designed to use plasma power input that is higher than the largest plasma torch because multiples of torches can be used, and that the plant can continue to operate when one plasma torch needs to be removed for maintenance because other plasma torches can be turned up to compensate. For example, while power levels less than one megawatt can be used, this system is capable of using power levels of 3 megawatts, or 6 megawatts, or more.

Figure 2:
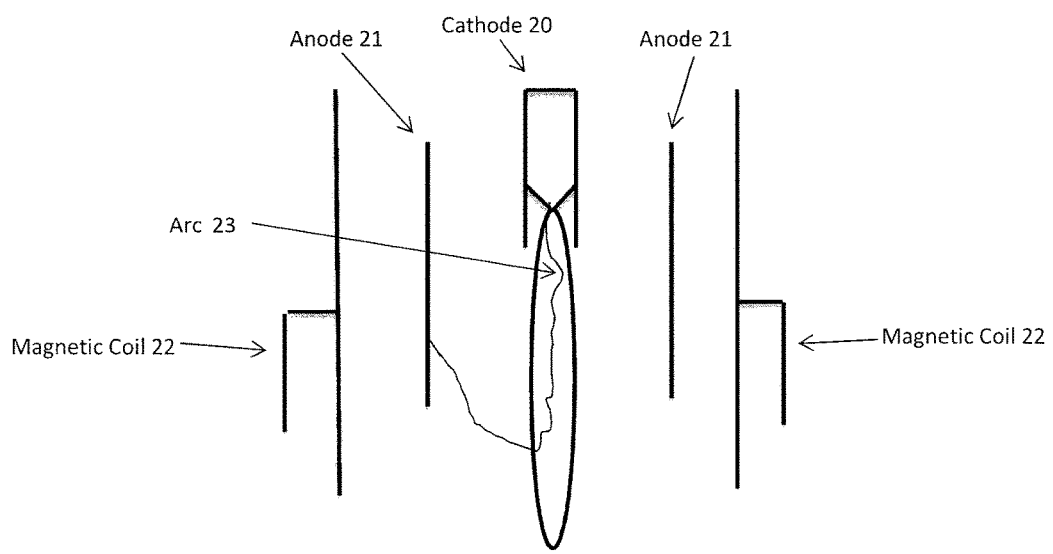
FIG. 2 shows a schematic representation of a typical apparatus with magnetic coils.

FIG. 1 shows a typical arrangement of multiple plasma torches (10) atop a process vessel (11) containing a processing area (12). With a typical non-transferred arc plasma torch, a magnetic field is sometimes employed within each plasma torch to spin and control the arc. This magnetic field is typically generated by copper coils (22) that are present within the body of the torch as shown in FIG. 2, having a cathode (20) and an anode (21). The magnetic coils should be oriented such that the coil creates a magnetic field where the axial direction is orthogonal to the arc generated where the arc (23) turns and goes in the radial direction relative to the axis of the torch.

Figure 3:
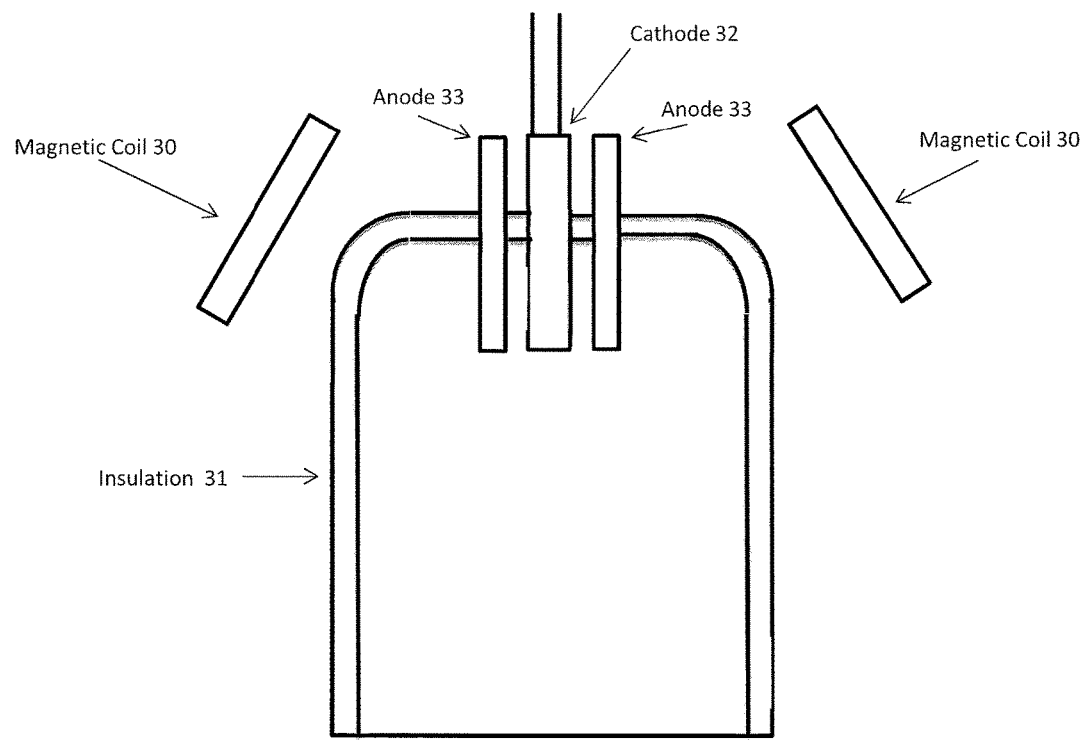
FIG. 3 shows a schematic representation of a typical apparatus with magnetic coils.

Typically non-transferred arc plasma torches use water cooled metal electrodes. It is also typical that a tungsten cathode and copper anode be used. These electrodes wear away slowly during use but typically do not break off in large chunks. As described herein, graphite electrodes are typically used to get higher thermal efficiency due to less need for water cooling. But graphite electrodes can break off in large chunks that can cause shorts between electrodes if the chunks do not fall out of the electrical path. In addition, plasmas produced with gas compositions over 90% hydrogen typically erode tungsten and copper electrodes very quickly, resulting in higher operating costs and significant downtime for electrode repair and replacement. The use of graphite electrodes as described herein are much more resistant to erosion in the hydrogen plasma and also much less costly to replace as they erode. But because the use of graphite electrodes results in the plasma torch electrodes being at much higher temperature, metallic magnetic coils are not practical to install near electrodes as shown, for example, in FIG. 2, and the coils (30) must be installed farther away from the electrodes (cathodes (32) and anodes (33)), i.e. outside or near the outer boundaries of an insulated shell (31), as shown, for example, in FIG. 3.

As shown in FIG. 1, metal electrode non-transferred plasma torches can be arranged at angles around an axially symmetrical reactor. A different configuration, however, is required for using multiple graphite electrode plasma torches because of magnetic coil temperature limitations, magnetic field interference, and graphite erosion patterns.

Figure 4:
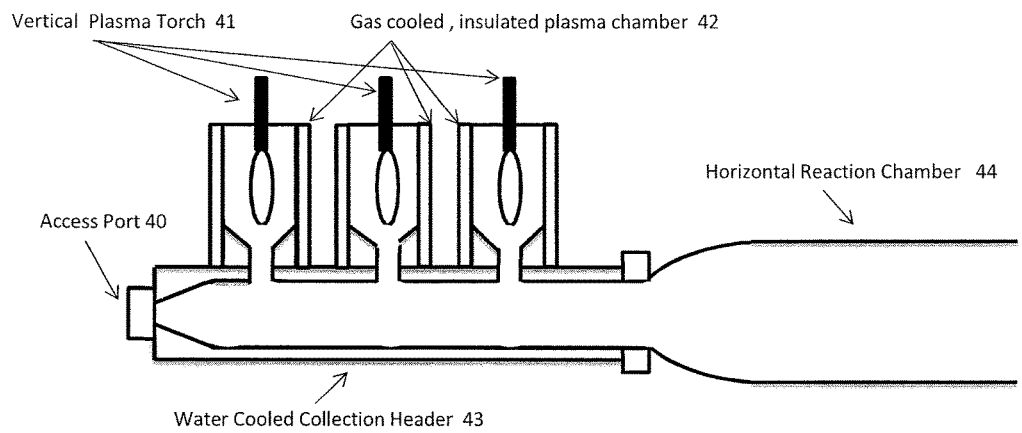
FIG. 4 shows a schematic representation of a horizontal plasma reactor.

FIG. 4 shows a typical basic configuration for a horizontal plasma heated reaction chamber (44) and multiple vertically oriented plasma torches (41) in chambers using two electrode graphite plasma torch technology, having an access port (40) and a water or gas cooled collection header (43). The insulated gas chamber (42) contains a lining which can be water or gas cooled as well, for example. As used herein, plasma torches which are described as vertically or substantially vertically oriented include torches whose orientation is within 20 degrees of a vertical axis.

Scale up of the two electrode graphite plasma torch for heating pure hydrogen has been challenging at best. For example, scale up has been limited by the availability of commodity grade graphite required for scale up. To build a vertically oriented graphite plasma torch using concentric electrode technology would require the use of more expensive iso-molded graphite or the use of barrel stave construction, both of which would result in a significant cost increase in the electrode material, a consumable in any process that utilizes this technology. The size of the plasma torch is dictated by the production capacity of the reactor. The required vertical or substantially vertical orientation of the torch and the way the torch is oriented along the axis of the reactor would typically result in a requirement for a vertical reactor. The inability to generate plasma heating at sufficient megawatts (MW) of power would result in higher cost per ton for a reactor because it limits the size of the reactor. The vertical orientation of a torch that is integral in the reactor could result in a higher installed cost of the reactor if it is then installed vertically. Decoupling the torch from the reactor could allow the installation of the reactor horizontally, which is typically of lower cost to install and an easier-to-maintain configuration.

Developing a method to install multiple hydrogen plasma torches in parallel to feed a common reactor results in the ability to scale the reactor up almost indefinitely. This impacts overall plant cost because for each reactor, because reduction or elimination of multiple inlet lines, control valves, and heat exchangers has a significant effect on cost, not to mention the significant increase in reactor capacities, e.g., up to 5 times or more what has been able to be generated in the past, i.e., the development of a plasma reactor with full industrial scale capacity with a significant cost advantage. And while the reactors described herein can scaled to product, for example, up to 5,000 tons of carbon black per year, they can also be scaled to produce up to 20,000 tons, up to 40,000 tons, or more.

In addition to the above, the ability to separate the plasma chamber from the reactor chamber with a water or gas cooled collection header in between allows for multiple advantages over what has been done in the past, some of which are, for example: the ability to control plasma flow to multiple reactors using a central plasma production unit. For example, carbon black reactors take on various dimensions for making different grades. A reactor for making N-234 carbon black is typically much smaller than a reactor for making N-550 carbon black. By separating the plasma chamber and plasma torch from the reactors allows for the installation of multiple reactors, of relatively low cost, on a single hydrogen collection header. This can allow for switching between the reactors, e.g., with conventional water cooled knife gate valves or flange spool pieces.

As described herein, this system can produce multiple grades, one grade at a time. The process and system described herein have the capability to make different grades with different reactor conditions, one grade at a time, rather than making multiple grades at the same time. Or multiple grades can be made in the respective multiple reactors with different reactor conditions present in the multiple reactors, i.e., capability to make a range of grades of carbon black with the individual grades being made depending on the respective reactor conditions. The particles making up a grade will span a wide range of grades, with the bulk properties needing to meet a set of specific bulk properties. For example, carbon black has a surface chemistry particularly suited to plastic applications such as wire and cable and utility plastics. This comes from the black having a more hydrophobic surface chemistry, sometimes referred to a dead or pure surface.

Figure 5:
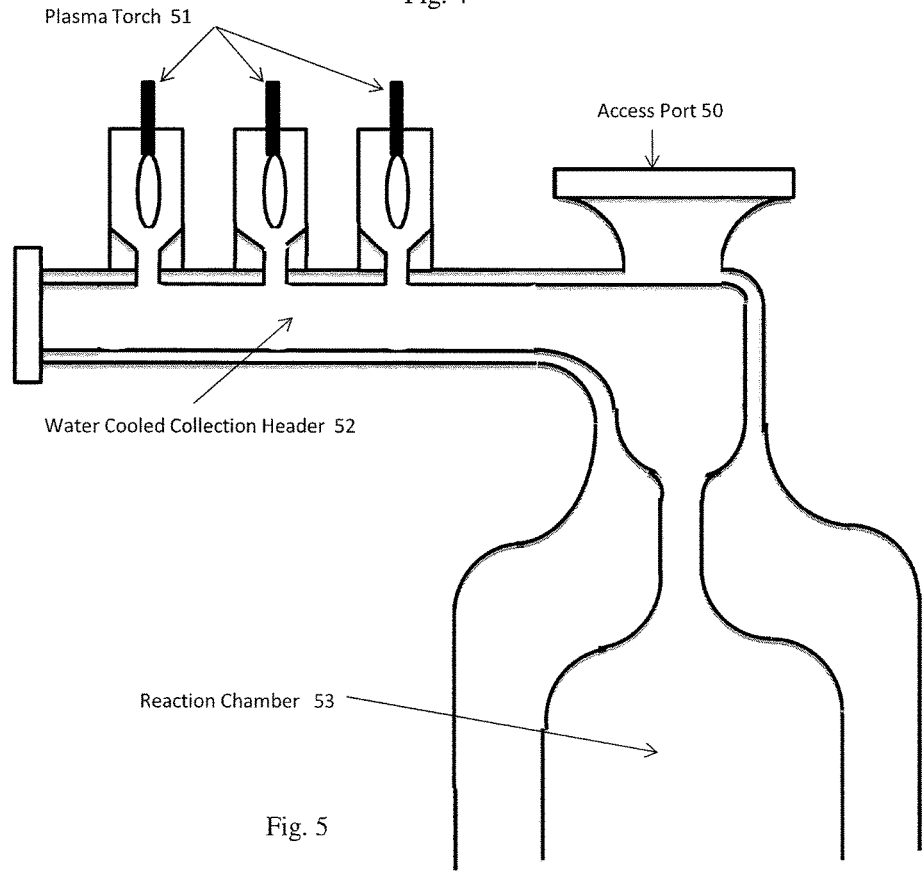
FIG. 5 shows a schematic representation of a multiple plasma torch embodiment described herein.
Figure 6:
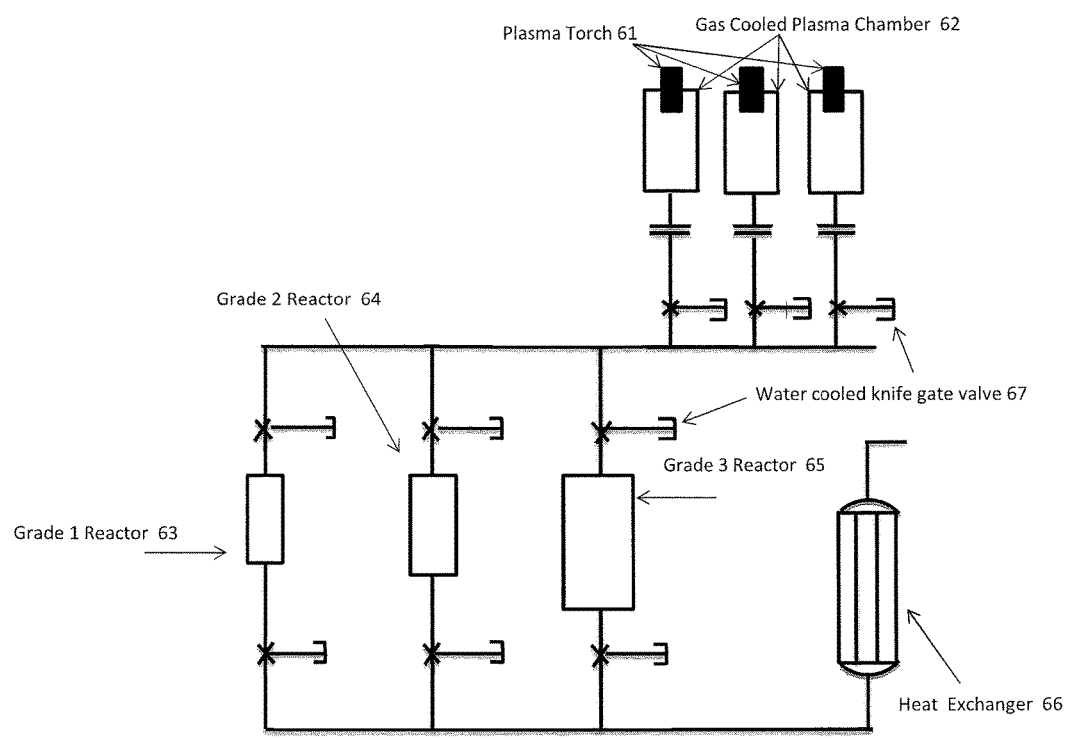
FIG. 6 shows a schematic representation of a multiple plasma torch embodiment described herein.

By increasing the number of plasma torches feeding a system, much higher reliability could be achieved for running the reactors almost continually. See, for example, FIG. 6 which shows schematically vertically oriented plasma torches (61) in gas cooled plasma chambers (62) connected to multiple reactors (63, 64, 65) designed to produce different grades, and a single heat exchanger (66); ability to remove individual plasma torches one at a time for inspection, maintenance, and/or replacement while other plasma torches are running and continuing to produce heat into the process. This could be achieved by means of a water cooled knife gate valves (67) and a nitrogen purge, one example of which is also shown schematically in FIG. 6; in the case where vertical orientation of a reactor is desired (see, for example, FIG. 5), or required, plasma torches could still be installed at or near ground level to help reduce installation costs and maintenance costs.

It is also typical in this field to install and align plasma torches axially with a production vessel. However, with the system as described herein, there is the possibility of the use of an access port (40) aligned with the axis of the production vessel, e.g, as shown schematically in FIG. 4. See also FIG. 5, which similarly shows a system with plasma torches (51), water or gas cooled collection header (52), reaction chamber (53), and access port (50). Such access ports allow for maintenance access, visibility with a camera or borescope, the use of a central axis injector, and other clear advantages as well.

EXAMPLE

Hydrogen gas is run in parallel past three sets of vertically oriented conventional plasma electrodes to generate a temperature of about 3000° C. in the plasma forming zone. Each set of plasma electrodes generates about 3 MW of thermal power into each parallel stream of approximately 1380 nanometers$^3$ per hour (Nm$^3$/hr) of hydrogen. The plasma formed then flows into a gas cooled collection heater with a combined flow rate of about 4140 Nm$^3$/hr prior to flowing into the reaction chamber. It is at this point as the plasma flows into the reaction chamber that methane gas is injected into the plasma at a mass flow rate between about 1600 and about 2200 kilogram (kg)/hr. The plasma-methane gas mixture then flows rapidly into a horizontally oriented reaction zone resulting in the production of a carbon black.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making carbon black, comprising:
   flowing a plasma gas into a plasma forming region containing multiple plasma torches, each of the multiple plasma torches including a magnetic coil and containing at least one electrode;
   forming a plasma from each plasma torch and combining plasmas formed from the multiple plasma torches in a collection region upstream of a reaction region;
   flowing the combined plasmas through the reaction region; and
   injecting, at a single injection stage downstream of the plasma forming region, carbon black forming feedstock reactants into the reaction region, resulting in the formation of at least one grade of carbon black.

2. The method of claim 1, including multiple electrodes.

3. The method of claim 1, wherein the at least one electrode is a graphite electrode.

4. The method of claim 3, wherein the plasma gas contains hydrogen.

5. The method of claim 1, wherein the at least one electrode comprises a sintered metal or metal oxide coating.

6. The method of claim 1, wherein the at least one electrode comprises copper, tungsten, aluminum, steel or an alloy thereof.

7. The method of claim 1, wherein the plasma forming region is separated from the reaction region by the collection region.

8. The method of claim 1, wherein at least one of the multiple plasma torches is vertically or substantially vertically oriented.

9. The method of claim 8, wherein the multiple plasma torches are vertically or substantially vertically oriented.

10. The method of claim 1, wherein the reaction region is horizontally oriented.

11. The method of claim 1, including multiple reaction regions.

12. The method of claim 1, wherein the at least one grade of carbon black is selected from a plurality of grades of carbon black, wherein a given grade of carbon black meets a set of specific bulk properties.

13. The method of claim 1, wherein a plasma torch of the multiple plasma torches is magnetically isolated one from another plasma torch of the multiple plasma torches.

14. The method of claim 1, further comprising flowing the combined plasmas through the reaction region to mix with and heat the carbon black forming feedstock reactants in the reaction region.

15. The method of claim 1, including a single reaction region.

16. The method of claim 1, wherein the collection region is cooled.

17. The method of claim 16, wherein the collection region is water or gas cooled.

* * * * *